United States Patent
Rao et al.

(10) Patent No.: US 9,736,732 B2
(45) Date of Patent: Aug. 15, 2017

(54) SYSTEM AND METHOD TO DYNAMICALLY MANAGE APPLICATION TRAFFIC BY BANDWIDTH APPORTIONING ON A COMMUNICATION DEVICE

(71) Applicant: SAMSUNG ELECTRONICS CO., LTD., Suwon-si (KR)

(72) Inventors: Deepak Ramesh Rao, Bangalore (IN); Karthikeyan Subramaniam, Bangalore (IN); Gyanchandani Monty, Bangalore (IN); Sweta Jaiswal, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/789,366

(22) Filed: Jul. 1, 2015

(65) Prior Publication Data

US 2016/0007233 A1 Jan. 7, 2016

(30) Foreign Application Priority Data

Jul. 1, 2014 (IN) .......................... 3237/CHE/2014

(51) Int. Cl.
*H04W 28/20* (2009.01)
*H04W 52/02* (2009.01)
*H04W 72/12* (2009.01)
*H04L 12/923* (2013.01)

(52) U.S. Cl.
CPC .......... *H04W 28/20* (2013.01); *H04L 47/762* (2013.01); *H04W 52/0264* (2013.01); *H04W 72/1242* (2013.01); *Y02B 60/50* (2013.01)

(58) Field of Classification Search
CPC ............. H04W 28/20; H04W 28/0273; H04W 36/0022; H04W 52/0264; H04W 72/048; H04W 72/0446; H04W 72/10; H04W 16/28; H04W 28/04; H04W 28/18; H04W 74/00; H04W 84/14; H04W 88/021; G06F 9/505
USPC ...................................... 455/452.2
See application file for complete search history.

(56) References Cited

U.S. PATENT DOCUMENTS

| | | | |
|---|---|---|---|
| 8,458,357 B2 * | 6/2013 | Menchaca | G06F 3/04847 709/224 |
| 9,008,673 B1 * | 4/2015 | Sanjeev | H04L 43/16 370/229 |
| 2007/0180119 A1 * | 8/2007 | Khivesara | H04L 12/1881 709/226 |

(Continued)

OTHER PUBLICATIONS

"3rd Generation Partnership Project; Technical Specification Group Services and System Aspects; Study on System Enhancements for User Plane Congestion Management (Release 13)", 3GPP TR 23.705 V13.0.0, Dec. 2014, 61 pages total.

*Primary Examiner* — Hirdepal Singh
(74) *Attorney, Agent, or Firm* — Sughrue Mion, PLLC (57) ABSTRACT

The present disclosure describes a method for dynamically modifying allocated bandwidth of one or more applications running on a communication device. The method comprises obtaining information regarding one or more applications running on the device, the applications using a communication network of the device; receiving a user input for determining priority levels of the one or more applications; and dynamically distributing bandwidth of a communication network to the one or more applications running on the communication device based on the user input.

20 Claims, 11 Drawing Sheets

(56) References Cited

U.S. PATENT DOCUMENTS

| | | | |
|---|---|---|---|
| 2010/0088707 A1* | 4/2010 | Corn | G06F 9/5027 718/104 |
| 2010/0098092 A1* | 4/2010 | Luo | H04L 12/24 370/401 |
| 2010/0144332 A1* | 6/2010 | Savoor | H04W 72/1242 455/418 |
| 2012/0252362 A1* | 10/2012 | Kawata | G06K 19/0719 455/41.1 |
| 2013/0100955 A1* | 4/2013 | Dunlap | H04L 47/20 370/392 |
| 2014/0226571 A1* | 8/2014 | Das | H04L 41/0896 370/329 |
| 2014/0247731 A1* | 9/2014 | Nagaraj | H04W 36/30 370/252 |
| 2015/0019740 A1* | 1/2015 | Zhao | H04L 41/5022 709/226 |
| 2015/0106502 A1* | 4/2015 | Shakhmetov | H04L 47/76 709/224 |
| 2015/0117213 A1* | 4/2015 | Pinheiro | H04W 28/0284 370/235 |
| 2015/0141029 A1* | 5/2015 | Guttman | H04W 16/04 455/452.1 |
| 2015/0309811 A1* | 10/2015 | Wisgo | H04W 4/00 719/331 |
| 2015/0373588 A1* | 12/2015 | C K | H04W 28/24 370/329 |

\* cited by examiner

SYSTEM AND METHOD TO DYNAMICALLY MANAGE APPLICATION TRAFFIC BY BANDWIDTH APPORTIONING ON A COMMUNICATION DEVICE

RELATED APPLICATION

Benefit is claimed to Indian Provisional Application No. 3237/CHE/2014 titled "SYSTEM AND METHOD TO DYNAMICALLY MANAGE APPLICATION TRAFFIC BY BANDWIDTH APPORTIONING ON MOBILE DEVICES" filed on 1 Jul. 2014 and Indian Application (Complete Specification) for the mentioned Provisional Application filed on Feb. 12, 2015, which are, herein incorporated in its entirety by reference for all purposes.

FIELD OF THE DISCLOSURE

The present disclosure generally relates to communication device and more particularly relates to a method and system for dynamically managing application traffic by bandwidth apportioning in a communication device.

BACKGROUND OF THE DISCLOSURE

In LTE network, when a communication device gets attached to the network, a default QoS (Quality of Service) class is created and default non-GBR bearer is shared equally among various applications traffic. This default sharing can impact the high priority application traffic since there is no guaranteed QoS available.

The Smartphone Users have no control over the default bearer traffic which impacts the performance and efficiency of high priority applications since the available bandwidth is shared among active applications. However there are certain cases where the bandwidth is shared based on defined priority such as high or low. But an additional bandwidth provided to the high priority application is not utilized properly due to several reasons. When the high priority application reached to either saturation level or stopped working, the unused bandwidth with the high priority application remains unutilized and goes wasted.

Therefore, there is a need for a method and system for dynamically modifying allocated bandwidth of one or more applications running on a communication device, and enabling a dynamic fallback mechanism in which high priority application on hitting the saturation point conditions due to server limitation or operator settings can renounce its bandwidth. The renounced bandwidth can be set to proportionately serve low priority applications. Further, whenever the high priority application is in need for additional bandwidth can take the bandwidth from the low priority application based on minimum threshold bandwidth with the low priority applications to keep running.

SUMMARY

An embodiment of the present disclosure describes a method for dynamically modifying allocated bandwidth of one or more applications running on a communication device. The method comprises obtaining information regarding one or more applications running on the device, the applications using a communication network of the device; receiving a user input for determining priority levels of the one or more applications; and dynamically distributing bandwidth of a communication network to the one or more applications running on the communication device based on the user input.

Another embodiment of the present disclosure describes a device dynamically modifying allocated bandwidth of one or more applications. The device comprises a display configured to displaying indications of the one or more of the applications running on the device, the one or more applications using a communication network of the device; a user interface configured to receive a user input with respect to the at least one from among the indications for determining priority levels of the one or more applications; and a processor configured to dynamically distributing bandwidth of a communication network to the one or more applications running on the communication device based on the user input.

Another embodiment of the present disclosure describes a system for dynamically modifying allocated bandwidth of one or more applications running in a communication device. The system, comprises an application managing module configured for monitoring one or more running applications, an application mapping module connected to the application managing module for mapping identification (ID) of the one or more applications with one or more running sessions of the one or more applications, a real time bandwidth calculating module connected to the application mapping module for calculating bandwidth to be allocated to the one or more applications categorized as one of a high priority application and low priority application, a policy making module connected to the real time bandwidth calculating module for receiving the one or more session information and priority information of the one or more applications, and a policy regulating module connected to the policy making module configured to modify one or more network parameters for the low priority applications, the policy regulating module monitors the one or more applications categorized as one of the high priority application and low priority application for optimum utilization of the bandwidth.

BRIEF DESCRIPTION OF THE ACCOMPANYING DRAWINGS

The aforementioned aspects and other features of the present disclosure will be explained in the following description, taken in conjunction with the accompanying drawings, wherein.

DETAILED DESCRIPTION OF THE DISCLOSURE

The embodiments of the present disclosure will now be described in detail with reference to the accompanying drawings. However, the present disclosure is not limited to the embodiments. The present disclosure can be modified in various forms. Thus, the embodiments of the present disclosure are only provided to explain more clearly the present disclosure to the ordinarily skilled in the art of the present disclosure. In the accompanying drawings, like reference numerals are used to indicate like components.

The specification may refer to "an", "one" or "some" embodiment(s) in several locations. This does not necessarily imply that each such reference is to the same embodiment (s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
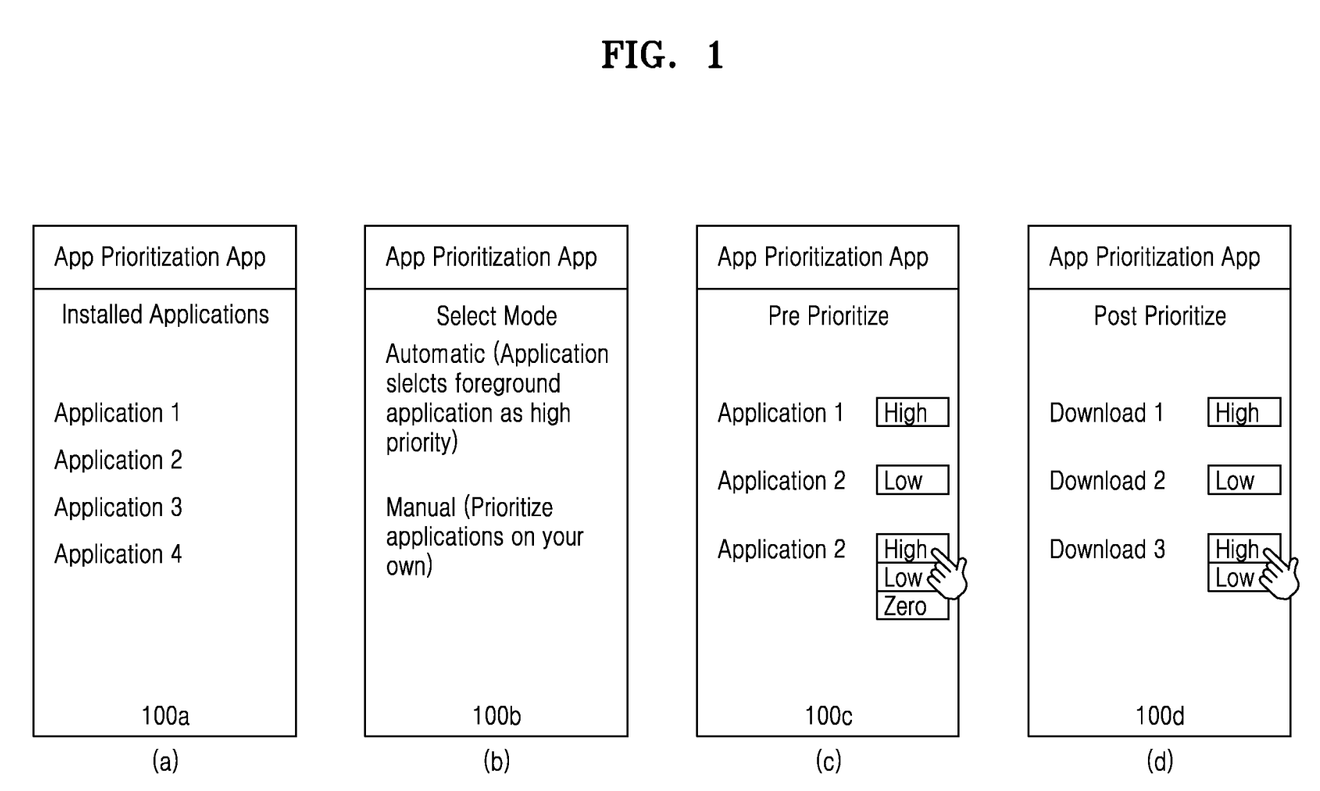
FIG. 1 illustrates a layout where user is given an opportunity to prioritize their preferred application to get a guaranteed and improve QoS, according to an embodiment of the present disclosure.

FIG. 1 illustrates a layout of a display screen of a communication device 100 for user to prioritize applications manually or automatically according to an embodiment of the present disclosure. In one exemplary embodiment, four applications are running on default bearer bandwidth in the communication device 100. When the user launches a prioritization application, a display Screen 100a as shown in FIG. 1a displays the list of applications that are using the bandwidths of the communication device 100. The list of applications may fall under the best effort traffic in the device 100. A display screen 100b shown in FIG. 1b may depicts at least two modes of selecting the priority, e.g., manual and automatic. The manual mode gives the user an option to select the high priority application. The automatic mode identifies the high priority application dynamically based on application status and allocated bandwidth based on a calculation carried out by a predefined algorithm. The predefined algorithm may include prior history of the applications, such as prior history of usage for downloading contents, streaming of contents, and voice communication, etc.

According to an exemplary embodiment, there may be 3 levels of priority defined for an application based on running status, i.e. high priority, low priority and zero priority as explained below:

High Priority: The applications listed under high priority are given a preference to occupy or share more bandwidth compared to other two priority level. These applications are relatively scaled to get high bandwidth. The TCP (Transmission Control Protocol) parameters for these high priority applications may be dynamically or automatically adjusted by a wireless network.

Low Priority: The applications listed under low priority are given less priorities by reducing the currently used bandwidth. For example, a system in the device 100 calculates minimum bandwidth for the low priority session to exist. The system may make all applications categorized under low priority be active but with a very limited bandwidth sharing.

Zero Priority: The applications listed under zero priority are not allowed to share any data through the network. For example, the according to the embodiment may ensure that there is no data transfer from these applications and the bandwidth is utilized for other applications with higher priorities.

According to an embodiment, pre-prioritization may be defined with a condition where a user selects a priority before the applications start. One of all 3 levels of priority for a particular application can be selected at this stage (Screen 100c) as shown in FIG. 1c.

According to an embodiment, post-prioritization may be defined with a condition where a user modifies the priorities while a particular application is running at foreground or background. One of only 2 priorities level such as high priority and low priority, can be applied at this stage (Screen 100d) shown in FIG. 1d. It is because the particular application is already running with using the bandwidth of the device.

Figure 2A:
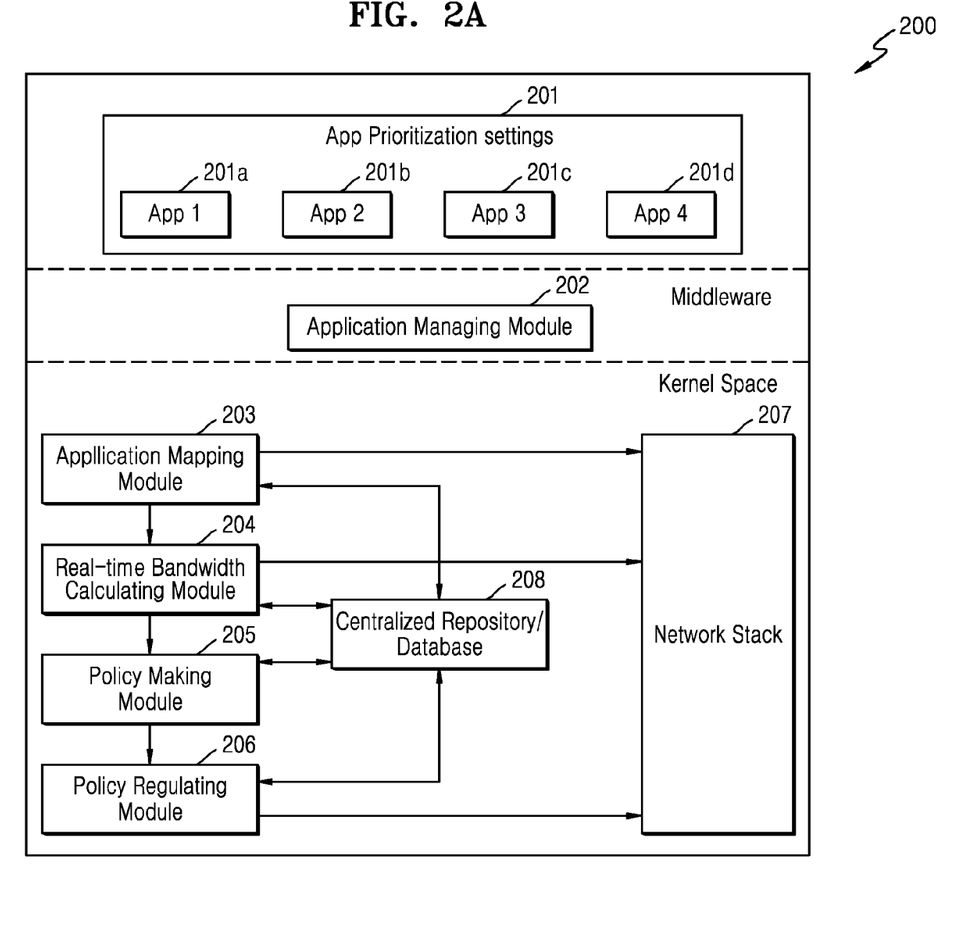
FIG. 2a, 2b illustrates block diagrams of a system for dynamically modifying allocated bandwidth of one or more application running a communication device, according to an embodiment of the present disclosure.

FIG. 2a illustrates a system 200 according to an embodiment for dynamically modifying allocated bandwidth of one or more applications 201 (such as 201a, 201b, 201c, . . . , 201n) running on a communication device 100 according to an embodiment of the present disclosure. The system 200 comprises an application managing module 202, an application mapping module 203, a real time bandwidth calculating module 204, a policy making module 205, and a policy regulating module 206. The system 200 also comprises a database 208 (or centralized repository 208). The application managing module 202, the application mapping module 203, the real time bandwidth calculating module 204, the policy making module 205, the policy regulating module 206, and the database 208 may be configured to be as hardware such as circuits as separate entities or one or more of them may be configured in a same hardware entity.

The application managing module 202 interacts with application layer and the Kernel layer blocks. The application managing module 202 performs one or more functions which include but not limited to:

a. Monitoring one or more running applications, b. Retrieving application ID of each of the applications and providing the same to the application mapping module 203, c. Invoking the application mapping module 203 when high priority application starts or closes.

d. Invoking the application mapping module 203 when Zero Priority application starts/closes.

The application mapping module 203 receives the list of application ID from the application managing module 202 for each of the running applications along with the details of running TCP sessions. The application mapping module 203 maps the application ID with all sessions running for the corresponding application.

The real time bandwidth calculating module 204 is configured for calculating bandwidth for high priority and low priority applications based on receiving (rx) and transmitting (tx) bytes. The real time bandwidth calculating module 204 invokes the policy making module 205 to determine the bandwidth to achieve priority.

The centralized repository or database 208 contains the details of every session which includes session ID, Source IP, Source Port, Destination IP, Destination Port. The database 208 also maintains minimum tolerance bandwidth needed to keep the low priority application without getting torn down.

The policy making module 205 reads the current session information and the priority levels of all the running applications for calculating minimum bandwidth and the step value for gradual reduction of bandwidth for all low priority applications while high priority application has no limit on in increase in bandwidth. The policy making module 205 invokes the policy regulating module 206 to enforce the changes and maintain it.

The policy regulating module 206 modifies session parameters for low priority applications. The policy regulating module 206 also monitors the high and low priority applications so that maximum utilization of bandwidth is ensured. If the high priority application bandwidth has reached the saturation limit (which means the application with a high priority is capable of using up to a particular level, i.e., saturation limit, of bandwidth while the application is allocated with a higher level of bandwidth than such particular level), then the policy regulating module 206 shares the remaining bandwidth to accommodate other low priority applications.

The system 200 is adapted for dynamically scaling the bandwidth just enough to meet the high priority application instead of fixing or quantifying bandwidth to a high priority application. For example, a streaming application when being set with higher priority, the system calculates minimum bit rate (MBR) required for good-enough streaming, e.g., seamless streaming, the video rather than fixing unnecessarily broad bandwidth for the application. The bandwidth conserved in this process may be referred as quiescent bandwidth. The system 200 includes a network stack 207 which represents the existing Linux Kernel Stack. In one embodiment, the system 200 can be designed on Linux platform, android platform, SLP platform, Tizen platform, or any other operating system platform.

In one embodiment, the system 200 is configured to transceive the data through a second radio access technology (RAT) when a first radio access technology (RAT) is unable to provide the pre-defined bandwidth.

Figure 2B:
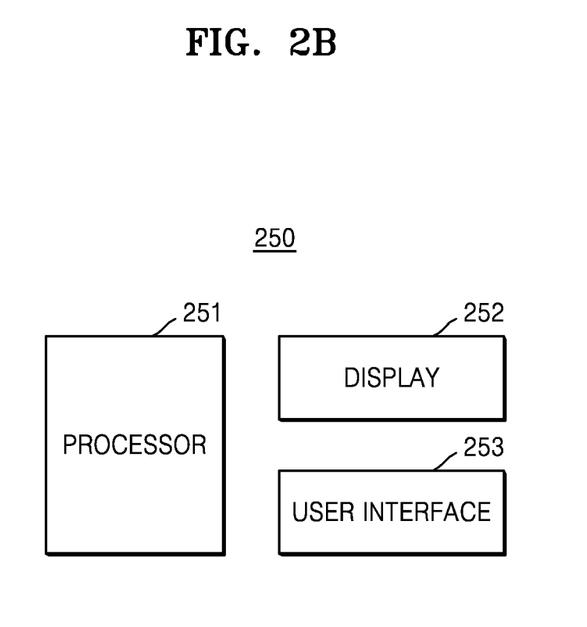

FIG. 2b illustrates a device 250 according to an embodiment for dynamically modifying allocated bandwidth for applications running on the device. Embodiments of dynamically modifying allocated bandwidth performed by the system 200 may be performed by the device 250.

The device 250 comprises a processor 251, a display 252 and a user interface 253. The processor 251, a display 252, and a user interface 253 may be implemented as hardware. The processor 251 may be any form of processor such as CPU or any other circuit.

The system 200 may be applied to the device 250. For example, a processor 251 may include at least one from among application managing module 202, application mapping module 203, real-time bandwidth calculating module 204, policy making module 205, and policy regulating module 206. A processor may directly or indirectly controls any hardware or modules of device 250. For example, the processor 251 may directly or indirectly controls display 252 and user interface 253. The processor 251 may also directly or indirectly controls at least one from among managing module 202, application mapping module 203, real-time bandwidth calculating module 204, policy making module 205, policy regulating module 206, database 208, and network stacks 207.

The processor 251 may obtain information regarding one or more applications running on the device. In particular, the one or more applications, information of which is obtained, may be applications using a communication network of the device. The information regarding one or more applications includes information on sessions that the one or more applications are using for a communications.

The display 253 may display the one or more applications. For example, the display may display indications of the one or more applications. The indications may be icons or names of the one or more applications.

The user interface 252 may receive a user input for determining priority levels of the one or more applications running on the device 250 using a communication network. The user interface 252 may be received on or with respect to the indications of the one or more applications. The processor 251 may select a particular application from among the one or more applications and change priority level of the selected particular application according to the user input.

Figure 3:
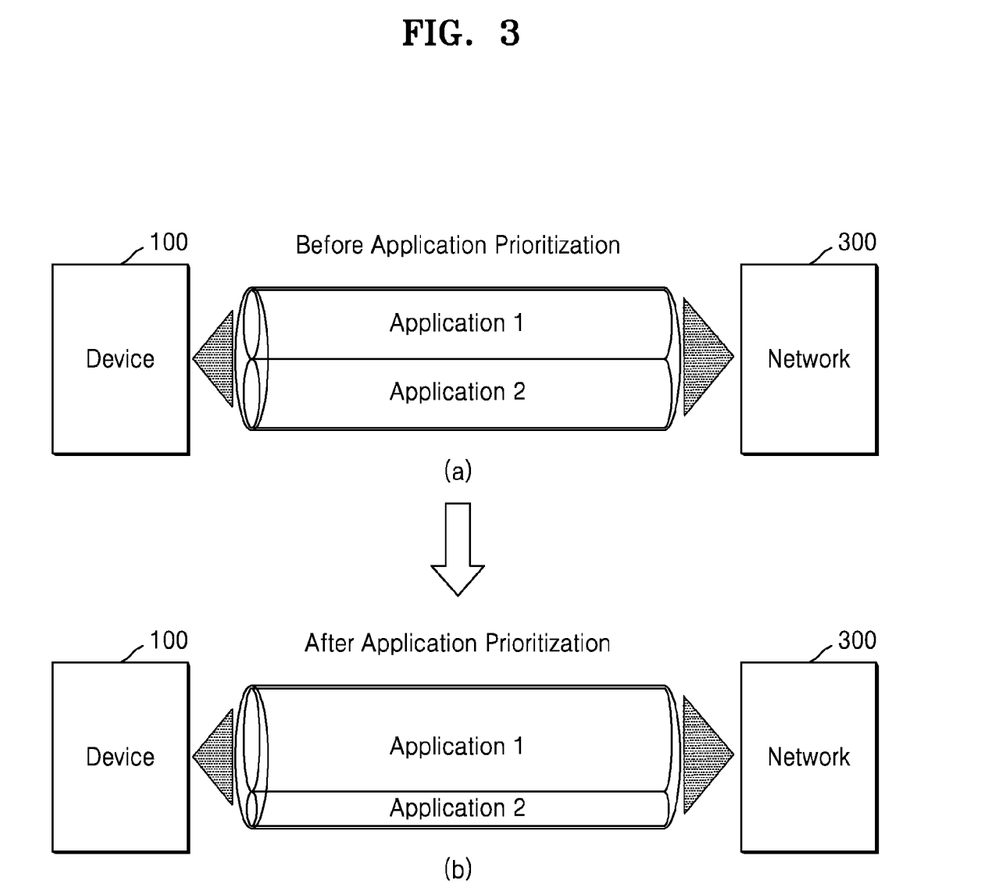
FIG. 3 illustrates a scenario where bandwidth is reallocated for high priority application, according to an embodiment of the present disclosure.

FIG. 3 illustrates an exemplary embodiment of sharing bandwidth between two applications according to an exemplary embodiment. In this embodiment, the device 100 is running two applications (i.e. Application 1 and Application 2) based on transceiving of data from a network 300. In FIG. 3a, the applications are running normally and the bandwidths are distributed equaling between the two applications. In FIG. 3b, application prioritization is applied and bandwidth is shared between the two applications according to priority of levels of the applications. In the present example, there are two applications i.e. Application1 and Application2, which share the best-effort bandwidth equally as shown in FIG. 3a. After the priority is set, the low priority application (Application 2) is monitored and the bandwidth is managed and controlled by the system 200 which indirectly leads Application 1 to expand its bandwidth as shown in FIG. 3b.

Figure 4:
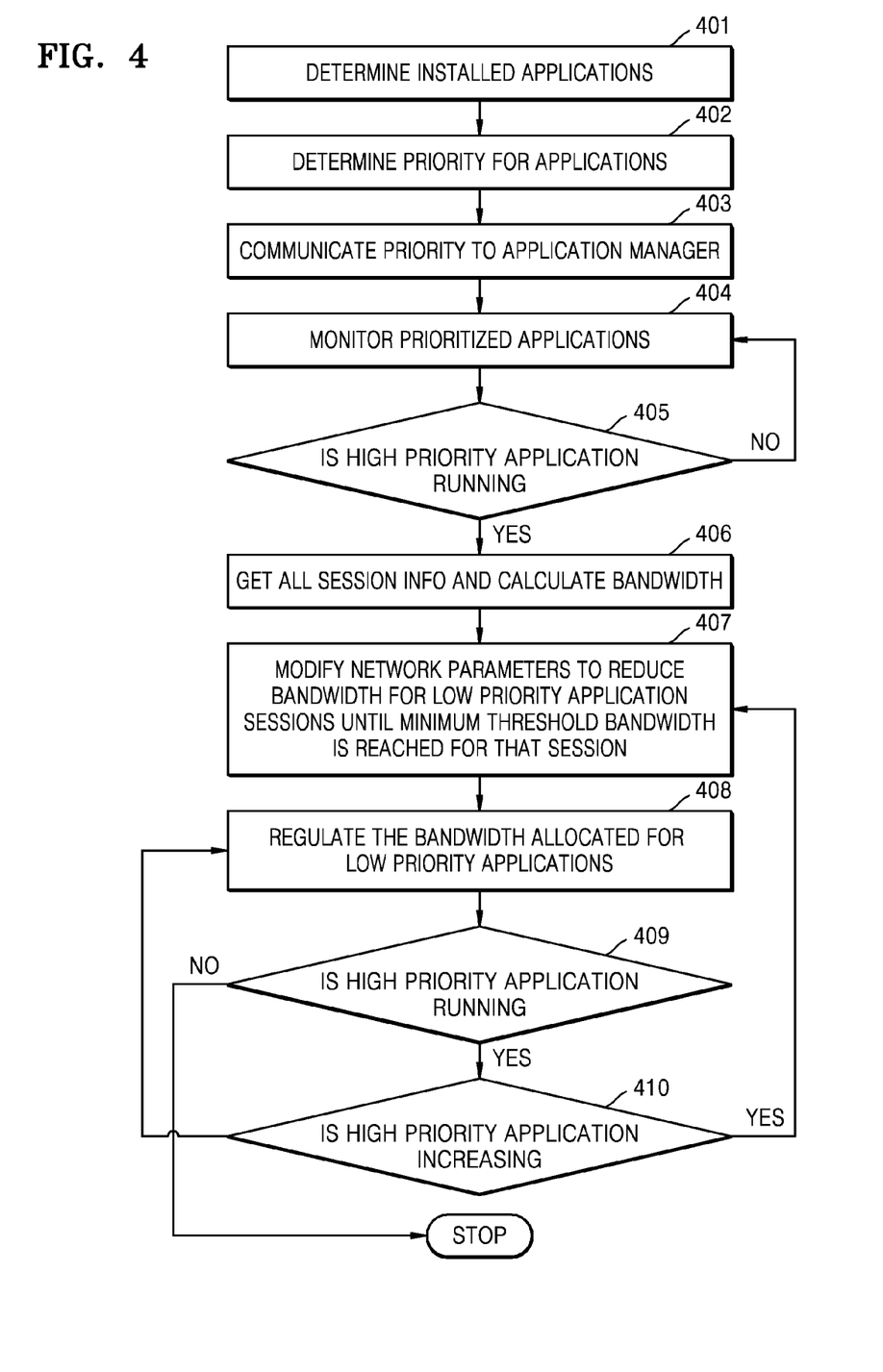
FIG. 4 illustrates a flowchart depicting application prioritization, according to an embodiment of the present disclosure.

FIG. 4 illustrates a flow chart of a method of dynamically modifying allocated bandwidth of one or more applications 201 running on a communication device 100 according to an embodiment of the present disclosure. This embodiment describes the flow of dynamic management of application's bandwidth (manual) for Pre-Prioritization case. The first step of App Prioritization solution is to identify applications using bandwidth of the device 100. The applications may use default-bearer bandwidth. A user selects the priority for each application. The list of priority details are sent to the application managing module 202 where it monitors the high priority and zero priority applications.

When High priority application comes to foreground and packet monitoring starts, the application mapping module 203 maps all session information with the running applications and stores the information in database 208. The bandwidth calculating module 204 calculates the relative bandwidth for all sessions. It decides the delta (reduced value) based on this relative bandwidth and controls the bandwidth for the low priority applications.

At step 401, one or more applications running on the communication device 100 are determined. At step 402, priority level of each of the applications is determined. At step 403, the priority level of each of the applications is communicated to the application managing module/application manager 202. At step 404, the prioritized applications are monitored. At step 405, check is performed to determine whether a high priority application is running. If yes, at step 406, all session information is derived and bandwidth available with the running applications is calculated. If no, the step 404 is performed. At step 407, the network parameter is modified to reduce the bandwidth for low priority application sessions until minimum threshold bandwidth is reached for that session. In one embodiment, the network parameter includes, but not limited to TCP parameter such as TCP widow size and buffer size. At step 408, the bandwidth allocated for low priority applications is regulated. At step 409, check is again performed to determine whether a high priority application is still running. If yes for the step 409, at step 410, check is performed to determine whether the bandwidth of the high priority application is increasing. If no for the step 409, the method of modifying allocated bandwidth of one or more applications running on the communication device 100 is stopped. Here and hereinafter, the 'application running on the communication device 100 is stopped' means which includes, but not limited to, paused, closed, completely served or any other events which stops the application from using dynamically modified bandwidth. If yes for the step 410, the step 407 is performed. If no for the step 410, the step 408 is performed.

Figure 5:
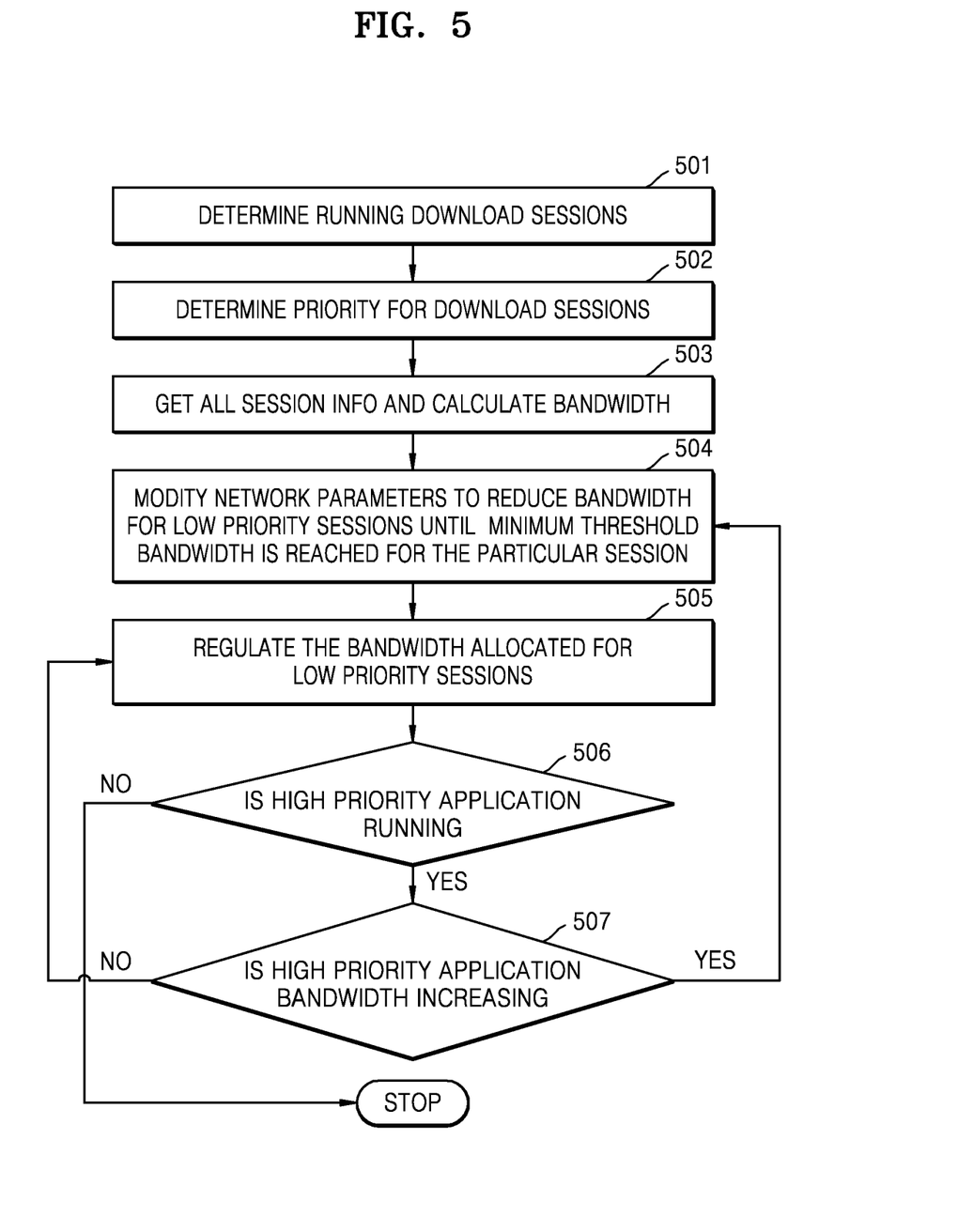
FIG. 5 illustrates a flowchart for download session prioritization, according to an embodiment of the present disclosure.

FIG. 5 illustrates a flow chart of a method of dynamically modifying allocated bandwidth of one or more applications running on a communication device 100 according to another embodiment of the present disclosure. In this embodiment, the dynamic prioritization is performed when the user changes the priority level of the one or more application 201 currently running in the background.

At step 501, download sessions of the one or more running applications are determined. At step 502, priority level of each of the download sessions is determined. At step 503, one or more session information are derived and bandwidth available with the running applications is calculated. At step 504, the network parameter is modified to reduce the bandwidth for low priority application sessions until minimum threshold bandwidth is reached for that session. In one embodiment, the network parameter includes, but not limited to TCP parameter such as TCP widow size and buffer size. At step 505, the bandwidth allocated for low priority applications is regulated. At step 506, check is again performed to determine whether a high priority application is still running. If yes for the step 506, at step 507, check is performed to determine whether the bandwidth of the high priority application is increasing. If no for the step 506, the method of modifying allocated bandwidth of one or more applications running on the communication device 100 is stopped. If yes for the step 507, the step 504 is performed. If no for the step 507, the step 505 is performed.

Figure 6:
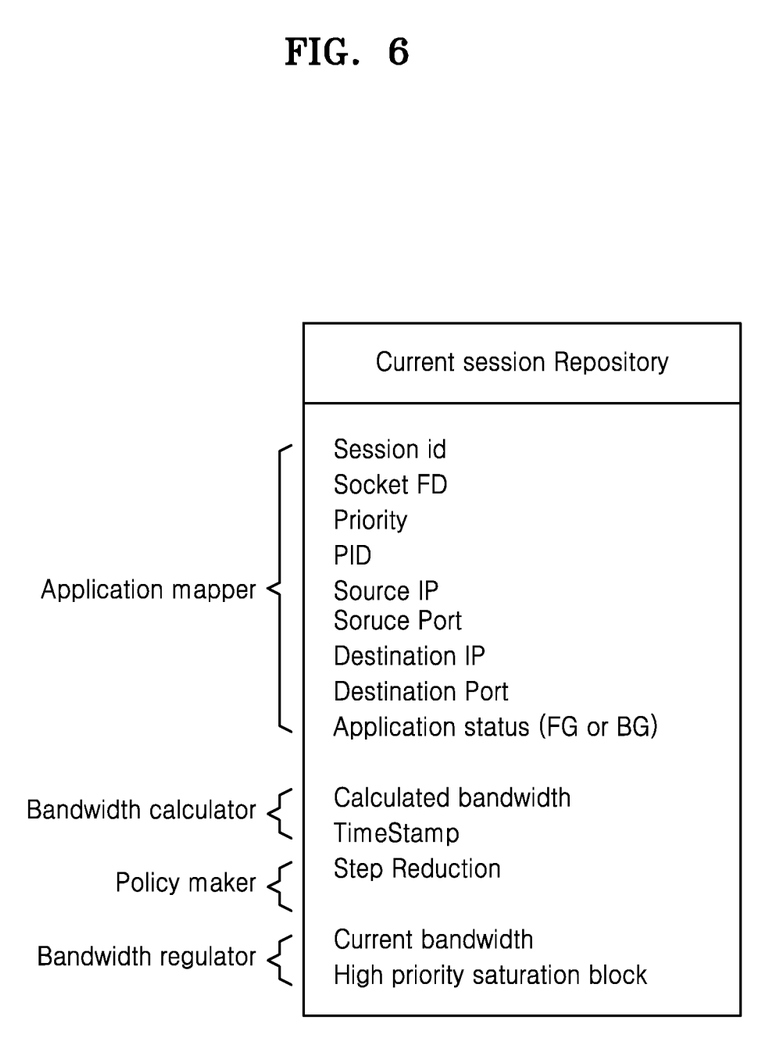
FIG. 6 illustrates the schema representation of current session repository with corresponding blocks and its parameters, according to an embodiment of the present disclosure.

FIG. 6 illustrates fields for all individual sessions, which are used in controlling the bandwidth according to an embodiment of the present disclosure. The fields for the application mapping module 203 includes but not limited to Session ID, Socket FD, Priority, PID, Source IP, Source Port, Destination IP, Destination port, Application status (such as foreground (FG) and background (BG)). The bandwidth calculating module 204 includes but not limited to calculated bandwidth, timestamp, step reduction. The policy making module 205 includes but not limited to step reduction. The bandwidth regulating module 206 includes but not limited to current bandwidth and high priority saturation block. The bandwidth calculating module 204, the policy making module 205, and the bandwidth regulating module 206 may be referred to as bandwidth calculator, policy maker, and bandwidth regulator, respectively.

Figure 7:
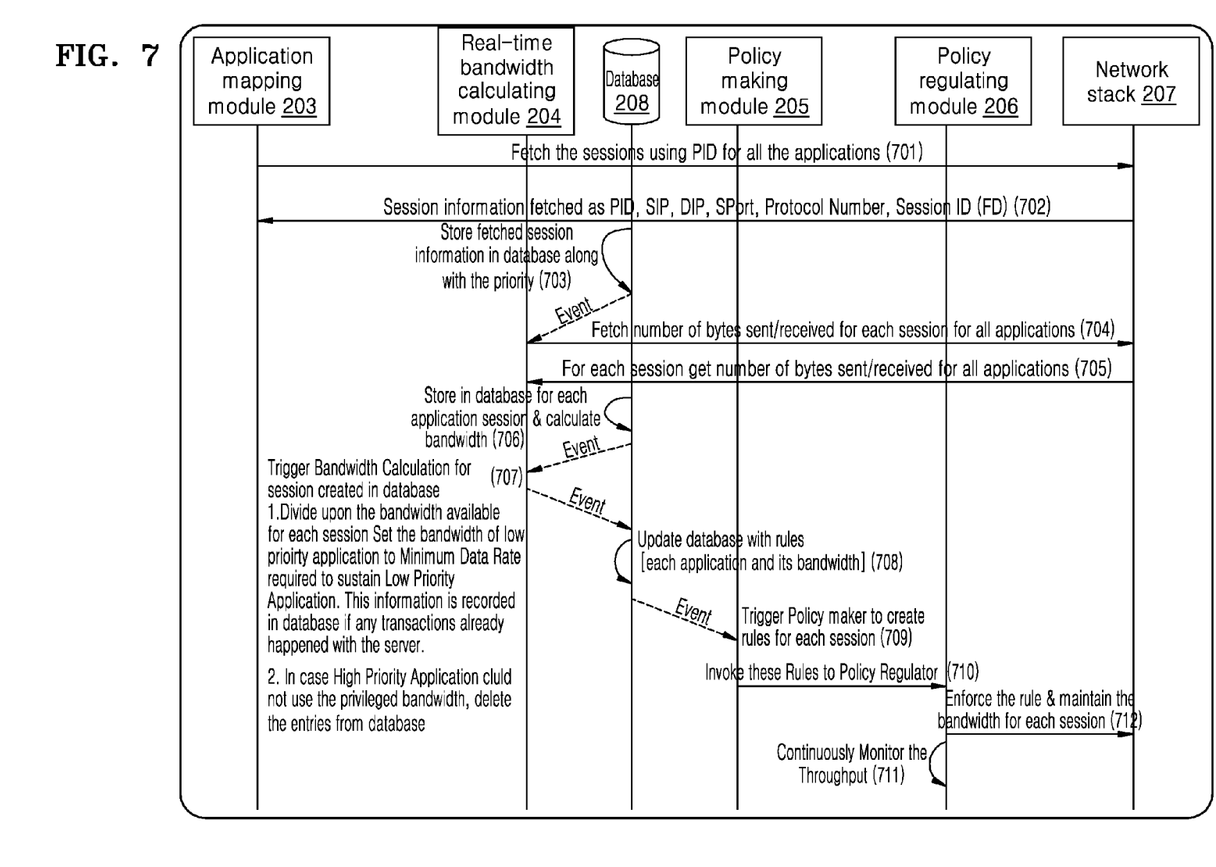
FIG. 7 illustrates a flow diagram of an application prioritization, according to an embodiment of the present disclosure.

FIG. 7 illustrates a flow diagram of a method of dynamically modifying allocated bandwidth of one or more applications 201 running on a communication device 100 according to an embodiment of the present disclosure. At step 701, the application mapping module 203 fetches a request for information of one or more sessions of one or more applications 201 running on the communication device 100 using PID to the network stack 207. At step 702, session information of the one or more applications 201 are fetched to the application mapping module 203 by the network stack 207 on receiving the request. The session information includes but not limited to PID, SIP, DIP, SPort, DPort, Protocol Number, Session ID (FD). At step 703, the session information received from the network stack 207 is stored in database 208 with the priority information. At step 704, the real time bandwidth calculating module 204 fetches a request for number of bytes sent/received for each session for the one or more running applications to the network stack 207. At step 705, number of bytes sent/received for each running session of the one or more applications 201 is received at the real time bandwidth calculating module 204 from the network stack. At step 706, number of bytes sent/received for each running session and calculated bandwidth for each running sessions are stored in the database 208. At step 707, the real time bandwidth calculating module 204 gets triggered to calculate the bandwidth for each session. Available bandwidth is divided among each session and specifies a section of the bandwidth of low priority application in order to maintain minimum data rate required to sustain low priority application. In case high priority application could not use the privileged bandwidth, the entries are deleted from the database 208. At step 708, the database 208 is updated with rules and calculated bandwidth for each application. At step 709, the policy making module 205 is subsequently triggered to create rules for each session. At step 710, the policy making module 205 invokes the rules to the policy regulating module 206. At step 711, the policy regulating module 206 continuously monitors the throughput. At step 712, the rules are enforced and the bandwidth for each session is maintained.

Figure 8:
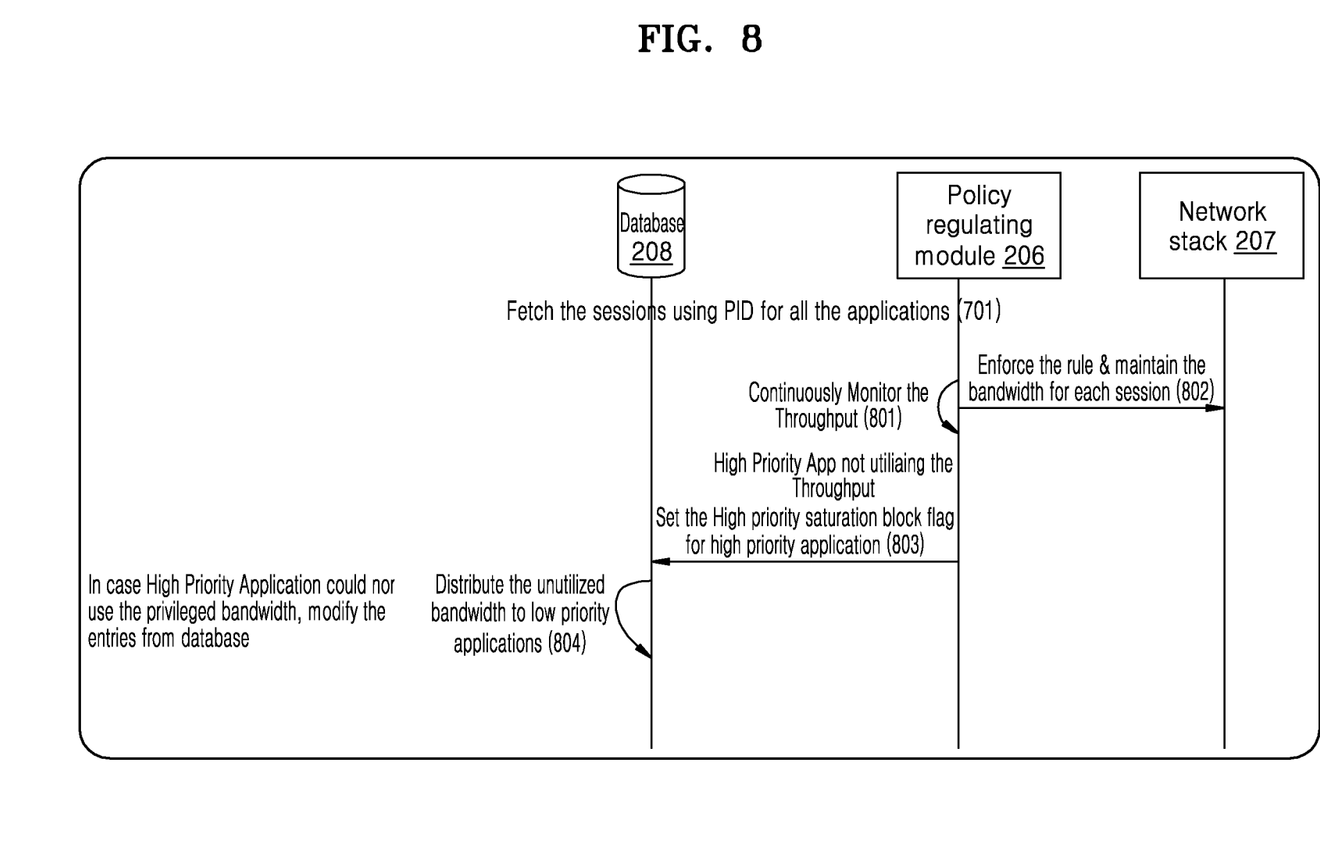
FIG. 8 illustrates a flow diagram in which high priority application is not utilizing the renounced bandwidth from low priority applications, according to an embodiment of the present disclosure.

FIG. 8 illustrates a flow diagram of a method of dynamically modifying allocated bandwidth of one or more applications 201 running on a communication device 100 according to an embodiment of the present disclosure. This embodiment is particularly describing a case when the high priority application is unable to utilize the bandwidth derived from the low priority applications. In this embodiment, the policy regulating module 206 continuously monitors the throughput at step 801. As the policy regulating module 206 finds that the high priority application is not utilizing the throughput, the instructions is provided to the network stack 207 to enforce the rule and maintain the bandwidth for each session at step 802. The instruction is also provided to the database 208 by the policy regulating module 206 to set high priority saturation block flag for the high priority application at step 803. Then the dynamic fallback mechanism is activated in which high priority application on achieving the saturation point condition due to server limitation or operator settings, can renounce its bandwidth. The renounced bandwidth/unutilized bandwidth is distributed among the low priority applications at step 804. The entries related to the high priority application are modified so that the current observation/learning can be utilized in the future.

Figure 9:
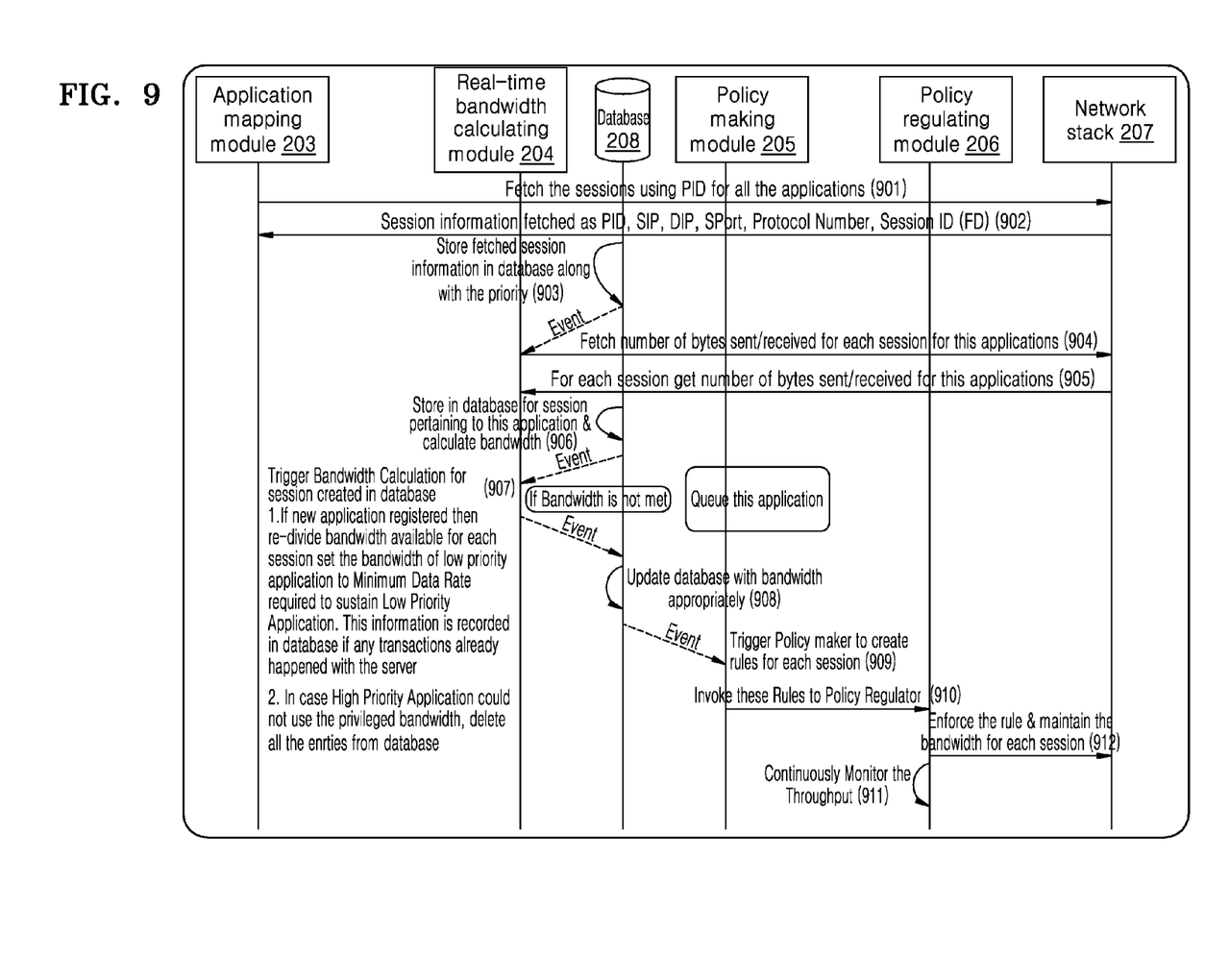
FIG. 9 illustrates a flow diagram of a method for new application registration, according to an embodiment of the present disclosure.

FIG. 9 illustrates a flow diagram of a method of dynamically modifying allocated bandwidth of one or more applications 201 running on a communication device 100 according to an embodiment of the present disclosure. At step 901, the application mapping module 203 fetches a request for information one or more session of one or more applications 201 on the communication device 100 using PID to the network stack 207. At step 902, session information of one or more applications are fetched to the application mapping module 203 by the network stack 207 on receiving the request. The session information includes but not limited to PID, SIP, DIP, SPort, DPort, Protocol Number, Session ID (FD). At step 903, the fetched session information is stored in the database 208 along with the priority information. At step 904, the real time bandwidth calculating module 204 fetches a request for information of number of bytes sent/received for each session for the one or more running applications to the network stack 207. At step 905, the information of the number of bytes sent/received for each running session of the one or more applications is provided to the real time bandwidth calculating module 204 by the network stack 207 on receiving the request. At step 906, the information of the number of bytes sent/received for each running session and calculated bandwidth for each running sessions are stored in the database 208. At step 907, the real time bandwidth calculating module 204 gets triggered to calculate the bandwidth for each session. When a new application is registered, re-divide the bandwidth available for each session and specify the bandwidth of low priority application in order to maintain minimum data rate required to sustain the low priority application. This information is recorded in the database 208 if any transaction already happened with the network 300. In case high priority application could not use the privileged bandwidth, the entries are deleted from the database 208. In case the available bandwidth is unable to meet the requirement of the one or more applications, the one or more applications are kept in queue. At step 908, the database 208 is updated with the revised rules and revised calculated bandwidth for each application. This in turn triggers the policy making module 205 at step 909 to create rules for each session. At step 910, the policy making module 205 invokes the rules to the policy regulating module 206. At step 911, the policy regulating module 206 continuously monitors the throughput. At step 912, the revised rules are enforced and the bandwidth for each session is maintained.

Figure 10:
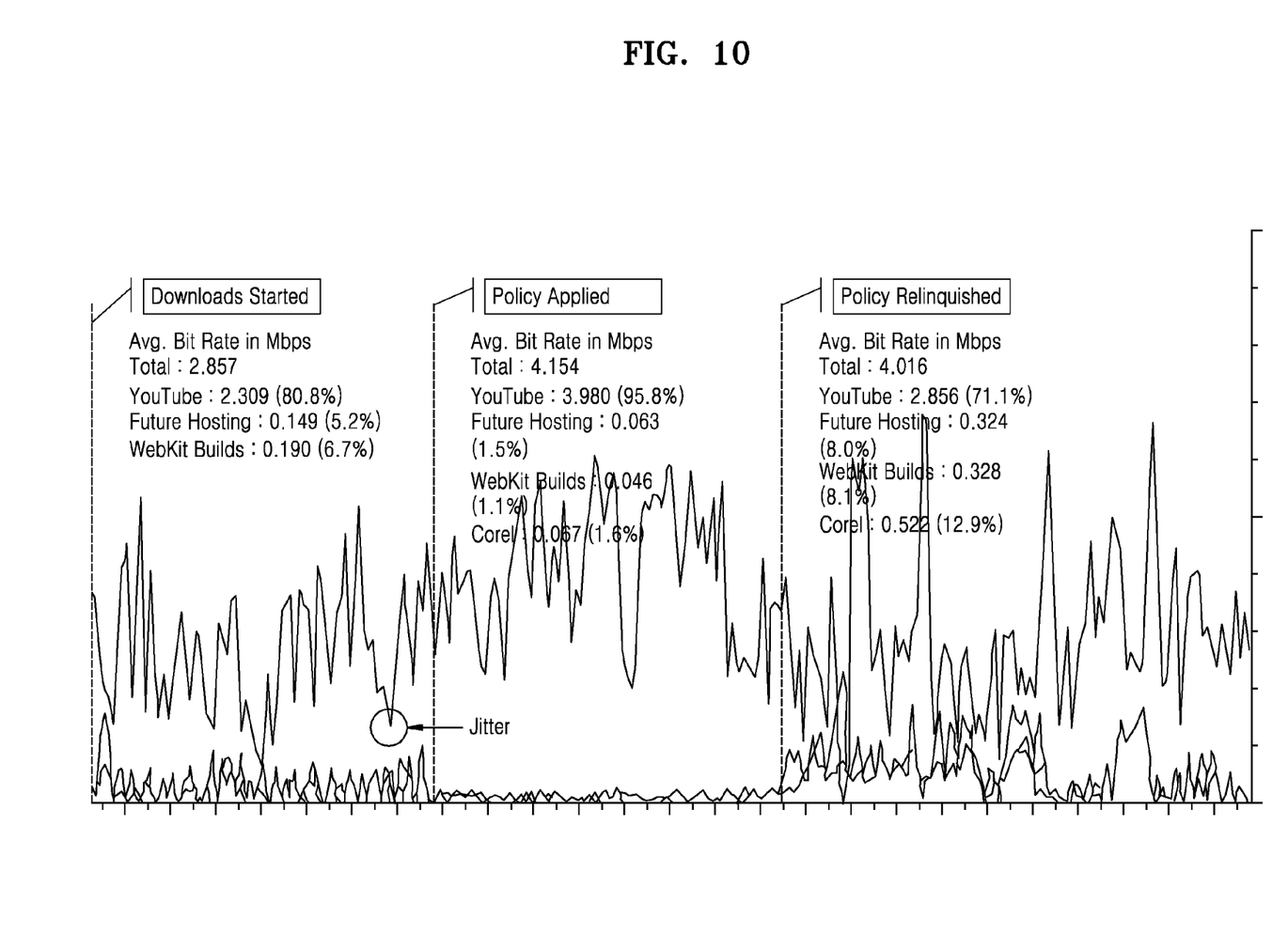
FIG. 10 illustrates an exemplary set of experimental results obtained from the present method running on a computing device/communication device, according to an embodiment of the present disclosure.

FIG. 10 illustrates an experimental result conducted to show the bandwidth occupied by YouTube and download traffic. Initially when the downloaded started, the total bandwidth available is 2.857 Mbps. YouTube is utilizing 80.8% of the total bandwidth i.e. about 2.309 Mbps. Future Hosting is using 5.2% of the total bandwidth i.e. about 0.149 Mbps. WebKit Builds is using 6.7% of the total bandwidth i.e. about 0.190 Mbps.

When a policy is applied, the total bandwidth is changed to 4.154 Mbps. YouTube is utilizing 95.8% of the total bandwidth i.e. 3.980 Mbps. Future Hosting is using 1.5% of the total bandwidth i.e. 0.063 Mbps. WebKit Builds is using 1.1% of the total bandwidth i.e. about 0.046 Mbps. Corel is using 1.6% of the total bandwidth i.e. about 0.067 Mbps.

When the applied policy is relinquished, the total bandwidth changed to 4.016 Mbps. YouTube is now using 71.1% of the total bandwidth i.e. about 2.856 Mbps. Future Hosting is now using 8% of the total bandwidth i.e. about 0.324. WebKit Builds is now using 8.1% of the total bandwidth i.e. about 0.328. Corel is now using 12.9% of the total bandwidth i.e. about 0.522.

Although the disclosure of the method and system has been described in connection with the embodiments of the present disclosure illustrated in the accompanying drawings, it is not limited thereto. It will be apparent to those skilled in the art that various substitutions, modifications and changes may be made thereto without departing from the scope and spirit of the disclosure.

We claim:

1. A method for dynamically modifying allocated bandwidth of one or more applications running on a communication device, comprising:
    obtaining information regarding one or more applications running on the device, the applications using a communication network of the device; and
    dynamically distributing bandwidth of the communication network to the one or more applications running on the communication device based on priority levels of the one or more applications,
    wherein the dynamically distributing the bandwidth of the communication network comprises:
    determining a minimum bandwidth required for running one or more sessions of the one or more applications predefined or categorized as low priority;
    modifying one or more network parameters for reducing the bandwidth of the one or more sessions of the one or more applications predefined or categorized as low priority;
    deriving a bandwidth from the one or more sessions of the one or more applications predefined or categorized as low priority; and
    determining bandwidth utilized for one or more sessions of the one or more applications predefined or categorized as high priority based on the derived bandwidth.

2. The method as claimed in claim 1, further comprising:
    displaying indications of the one or more applications; and
    receiving a user input for determining the priority levels of the one or more applications,
    wherein the user input is received with respect to at least one from among the indications of the one or more applications,
    wherein a priority level of the at least one application from among the one or more displayed applications is changed according to the user input.

3. The method as claimed in claim 1, wherein the dynamically distributing the bandwidth of the communication network further comprises:
    monitoring usage of the derived bandwidth by the one or more sessions of the one or more applications predefined or categorized as high priority; and regulating the bandwidth allocated to the one or more sessions of the one or more applications predefined or categorized as low priority.

4. The method as claimed in claim 3, wherein the network parameter comprises at least one of a TCP (Transmission Control Protocol) window size and buffer size.

5. The method as claimed in claim 3, wherein the deriving a bandwidth from the one or more sessions of the one or more applications predefined or categorized as low priority comprises providing controlled modification to the one or more network parameters in order to gradually reduce bandwidth of the one or more sessions of the one or more applications predefined or categorized as low priority, thereby minimizing the data loss.

6. The method as claimed in claim 3, wherein the dynamically distributing the bandwidth of the communication network further comprises discontinuing providing of at least a portion of the derived bandwidth when the one or more sessions of the one or more applications predefined or categorized as high priority fail to utilize the at least a portion of the derived bandwidth.

7. The method as claimed in claim 1, wherein the one or more applications are manually categorized as one of a high priority application and low priority application through an user interface (UI).

8. The method as claimed in claim 1 further comprising configuring the communication device to transceive data through a second radio access network (RAT) when a first radio access network (RAT) is unable to provide a predefined bandwidth.

9. The method as claimed in claim 1 further comprising suspending the one or more low priority applications when a battery power consumption reaches to threshold in order to save battery power of the communication.

10. The method as claimed in claim 6, wherein the dynamically distributing the bandwidth of the communication network further comprises distributing among the one or more sessions of the one or more applications predefined or categorized as low priority, the at least a portion of the derived bandwidth which fails to be utilized by the one or more sessions of the one or more applications predefined or categorized as high priority.

11. The method as claimed in claim 1, wherein the determining the bandwidth for one or more sessions of the one or more applications predefined or categorized as high priority comprises providing the derived bandwidth to one or more sessions of the one or more applications predefined or categorized as high priority.

12. The method as claimed in claim 1, further comprising:
receiving a user input for determining priority levels of the one or more applications,
wherein the bandwidth for communication to the one or more applications running on the communication device is dynamically distributed based on the user input.

13. A device dynamically modifying allocated bandwidth of one or more applications, comprising:
a display configured to displaying indications of the one or more of the applications running on the device, the one or more applications using a communication network of the device; and
a processor configured to dynamically distributing bandwidth of the communication network to the one or more applications running on the communication device based on priority levels of the one or more applications, wherein the processor:

determines a minimum bandwidth required for running one or more sessions of the one or more applications predefined or categorized as low priority;
modifies one or more network parameters for reducing the bandwidth of the one or more sessions of the one or more applications predefined or categorized as low priority;
derives a bandwidth from the one or more sessions of the one or more applications predefined or categorized as low priority; and
determines bandwidth utilized for one or more sessions of the one or more applications predefined or categorized as high priority based on the derived bandwidth.

14. The device of claim 13, wherein a priority level of the at least one application from among the one or more displayed applications is changed according to a user input which is received with respect to the at least one from among indications for determining priority levels of the one or more applications.

15. A system for dynamically modifying allocated bandwidth of one or more applications running in a communication device, comprising:
an application managing module configured for monitoring one or more running applications;
an application mapping module connected to the application managing module for mapping identification (ID) of the one or more applications with one or more running sessions of the one or more applications;
a real time bandwidth calculating module connected to the application mapping module for calculating bandwidth to be allocated to the one or more applications categorized as one of a high priority application and low priority application;
a policy making module connected to the real time bandwidth calculating module for receiving the one or more session information and priority information of the one or more applications for calculating a minimum bandwidth required for running one or more sessions of the one or more applications predefined or categorized as low priority; and
a policy regulating module connected to the policy making module configured to modify one or more network parameters for the low priority applications, monitor the one or more applications categorized as one of the high priority application and low priority application for optimum utilization of the bandwidth, derive a bandwidth from the one or more sessions of the one or more applications predefined or categorized as low priority, and determine bandwidth utilized for one or more sessions of the one or more applications predefined or categorized as high priority based on the derived bandwidth,
wherein the application managing module, the application mapping module, the real time bandwidth calculating module, the policy making module, and the policy regulating module are implemented by a processor.

16. The system as claimed in claim 15, further comprising a database for storing information comprises session ID, source IP, source port, destination IP, destination port, and minimum tolerance bandwidth of the one or more applications.

17. The system as claimed in claim 15, wherein the network parameter comprises at least one of a TCP (Transmission Control Protocol) window size and buffer size.

18. The system as claimed in claim 15, wherein the policy making module reads a step value for gradual reduction of bandwidth for low priority applications.

19. The system as claimed in claim 15, wherein the real time bandwidth calculating module, when a new application is registered, re-divides the bandwidth available for each session and specifies the bandwidth of the low priority application in order to maintain a minimum data rate required to sustain the low priority application.

20. The system as claimed in claim 16, wherein the database stores the minimum bandwidth required for running the one or more sessions of the one or more applications predefined or categorized as low priority.

* * * * *